United States Patent
Jones et al.

(10) Patent No.: US 8,249,551 B2
(45) Date of Patent: Aug. 21, 2012

(54) LONG-TERM EVOLUTION (LTE) POLICY CONTROL AND CHARGING RULES FUNCTION (PCRF) SELECTION

(75) Inventors: D. Mark Jones, Ottawa (CA); Halim Ben-Hajla, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 809 days.

(21) Appl. No.: 12/261,718

(22) Filed: Oct. 30, 2008

(65) Prior Publication Data

US 2009/0305684 A1 Dec. 10, 2009

Related U.S. Application Data

(60) Provisional application No. 61/059,245, filed on Jun. 5, 2008.

(51) Int. Cl.
*H04M 11/00* (2006.01)

(52) U.S. Cl. .................... 455/406; 455/552.1; 709/229; 709/232

(58) Field of Classification Search .................. 455/406
See application file for complete search history.

(56) References Cited

U.S. PATENT DOCUMENTS

| | | | |
|---|---|---|---|
| 6,954,790 B2 | 10/2005 | Forslöw | |
| 7,170,982 B2 | 1/2007 | Li et al. | |
| 7,266,100 B2 | 9/2007 | Le et al. | |
| 7,292,592 B2 | 11/2007 | Rune | |
| 2005/0088971 A1 | 4/2005 | Qing et al. | |
| 2005/0235065 A1 | 10/2005 | Le et al. | |
| 2006/0067338 A1 | 3/2006 | Hua et al. | |
| 2006/0291486 A1 | 12/2006 | Cai et al. | |
| 2007/0005491 A1 | 1/2007 | Koho | |
| 2007/0055874 A1 | 3/2007 | Phan-Anh et al. | |
| 2007/0100981 A1 | 5/2007 | Adamczyk et al. | |
| 2007/0288655 A1 | 12/2007 | Price et al. | |
| 2007/0297419 A1 | 12/2007 | Askerup et al. | |
| 2008/0026724 A1 | 1/2008 | Zhang | |
| 2008/0305825 A1* | 12/2008 | Shaheen | 455/552.1 |
| 2009/0043902 A1* | 2/2009 | Faccin | 709/229 |
| 2009/0300207 A1* | 12/2009 | Giaretta et al. | 709/232 |

OTHER PUBLICATIONS

3GPP TS 29.328 V8.0.0 (Mar. 2008), p. 7, Section 5.1.1.*
Kueh et al., "Evolution of Policy Control and Charging (PCC) Architecture for 3GPP Evolved System Architecture," *Vehicular Technology Conference, 2006, VTC 2006-Spring IEEE 63rd* 1:259-263.
3rd Generation Partnership Project; Technical Specification Group Core Network and Terminals; Diameter-Based Protocols Usage and Recommendations in 3GPP (Release 8); 3GPP Organizational Partners (Jun. 2008).
Long Term Evolution (LTE): an Introduction, Ericsson AB (Oct. 2007).

* cited by examiner

*Primary Examiner* — Vladimir Magloire
*Assistant Examiner* — Gerald Johnson
(74) *Attorney, Agent, or Firm* — Zilka-Kotab, PC

(57) ABSTRACT

The PCRF Selection Function selects the PCRF for an IP-CAN session. In embodiments, the PCRF Selection Function is located in the HSS and/or the 3GPP AAA server. The PCRF Selection Function is only required to be located in the HSS if a Bearer Binding and Event Reporting Function (BBERF) is deployed in the serving gateway. In this case, the PCRF selection takes place at the time that the PDN Gateway is selected and returned by the HSS to the serving gateway over the HSS to MME interface (S6a).

20 Claims, 4 Drawing Sheets

LONG-TERM EVOLUTION (LTE) POLICY CONTROL AND CHARGING RULES FUNCTION (PCRF) SELECTION

CROSS REFERENCE TO RELATED APPLICATIONS

The present application claims the benefit of U.S. Provisional Patent Application No. 61/059,245, entitled "Long-Term Evolution (LTE) Policy Control and Charging Rules Function (PCRF) Selection", filed on Jun. 5, 2008, which is hereby expressly incorporated by reference in its entirety.

BACKGROUND OF THE INVENTION

1. Field of the Invention

The present invention relates generally to Third Generation Partnership Project (3GPP networks) and specifically to packet policy control and charging rules function selection in a 3GPP network.

2. Background Art

An increasingly large number of individuals use portable computing devices, such as laptop computers, personal data assistants (PDAs), smart phones and the like, to support mobile communications. The number of computing devices, and the number of networks that these devices connect to, has increased dramatically in recent years. Similarly, an increasing number of wireless Internet access services have been appearing in airports, cafes and book stores.

As telecommunications technology continues to evolve to meet this ever increasing demand, service providers continue to make investments in state-of-the-art technology in order to remain at the forefront of offerings in the marketplace. However, in order to maximize their return on investment, service providers are constantly challenged to more effectively market their technology offerings by offering richer choices to their subscriber base, and to deliver those choices in a timely and seamless fashion.

The Third Generation Partnership Project (3GPP) long term evolution (LTE) reference architecture defines the use of one or more policy control and charging rules functions (PCRF). As the name implies, PCRF provides policy control decision and flow-based charging control functionalities. For example, the PCRF provides network control regarding service data flow detection, gating, quality of service (QoS), and flow based charging to the policy control enforcement function. In addition, the PCRF may also apply security procedures before accepting service information from an Application Function (AF). Additionally, the PCRF determines how a certain data flow is treated in the policy control enforcement function and ensures that the enforcement function traffic mapping and treatment is in accordance with the user's subscription profile. For example, the PCRF delivers rules around traffic classification, QoS, and charging to the enforcement functions.

The Diameter Routing Agent (DRA) maintains information about user identity, access point name (APN), the user equipment IP address(es) and the selected PCRF for an IP-connectivity access network (IP-CAN) session. The DRA initially allocates a PCRF for a session. Additionally, the DRA may be queried by other network entities that need to change an existing session or establish a new Quality of Service (QoS). The DRA returns the address of the PCRF to the requesting entity.

When the DRA first receives a request for an IP-CAN session, the DRA selects a suitable PCRF for the IP-CAN session and stores the PCRF address. Subsequently, the DRA can retrieve the selected PCRF address according to information carried by the incoming requests from other entities.

Three methods are currently being proposed for accessing a PCRF for an existing session. A redirect DRA is an enhanced form of the Diameter redirect agent functionality. The redirect DRA is used to redirect clients to the appropriate PCRF. A proxy DRA is an enhanced form of the Diameter proxy agent functionality. A proxy DRA is used to forward messages from clients to the appropriate PCRF. Finally, the optimized proxy DRA is a hybrid solution where a proxy is used on IP-CAN session establishment and termination but session modification messages are sent directly to the selected PCRF.

All of these solutions require deployment of additional DRA elements in the network. Furthermore, the DRA messaging introduces additional latency on IP CAN session establishment and termination. The redirect DRA and optimized proxy DRA solutions also have transport connection scaling issues and the proxy DRA solution introduces additional latency to IP CAN session modification exchanges due to the message forwarding.

What is therefore needed is a technique for accessing a PCRF for an existing session that does not introduce additional latency nor pose transport connection scaling issues.

BRIEF SUMMARY OF THE INVENTION

In an embodiment of the present invention, the DRA is considered as a PCRF Selection Function, within an existing element, rather than as a new element. The PCRF Selection Function shares a common state store that contains the User-Equipment-to-PCRF binding for a given IP-Can session.

In various embodiments of the present invention, the PCRF Selection Function can be housed in either the HSS and/or the 3GPP AAA server. No additional interfaces or changes to existing interfaces are required for either 3GPP access or non-3GPP access.

In a further embodiment of the present invention, the PCRF Selection Function is required to be located in the HSS only if a Bearer Binding and Event Reporting Function (BBERF) is deployed in the serving gateway. In this embodiment, the PCRF selection takes place at the same time that the PDN Gateway is selected and returned by the HSS to the Serving Gateway over the S6a interface.

In other embodiments of the present invention, the selected PCRF may also be communicated to the PDN Gateway over the S8 interface, if it is already known by the serving gateway.

In a still further embodiment of the present invention, the PCRF may also be communicated over the S6b interface (interface between the 3GPP AAA and the PDN gateway) if a 3GPP AAA is deployed, or over an SGi interface if a AAA function is deployed to facilitate the operator's IP services. For IMS and non-IMS application functions, the selected PCRF can be returned by the HSS to the application over the Sh interface. Because each of the embodiments uses existing signaling connections, the transport connection scaling issues present with the re-direct DRA do not exist with the HSS-based PCRF Selection Function and/or the 3GPP AAA-based PCRF Selection Function. Moreover, no additional latency in the IP-CAN session establishment, modification, or termination results.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
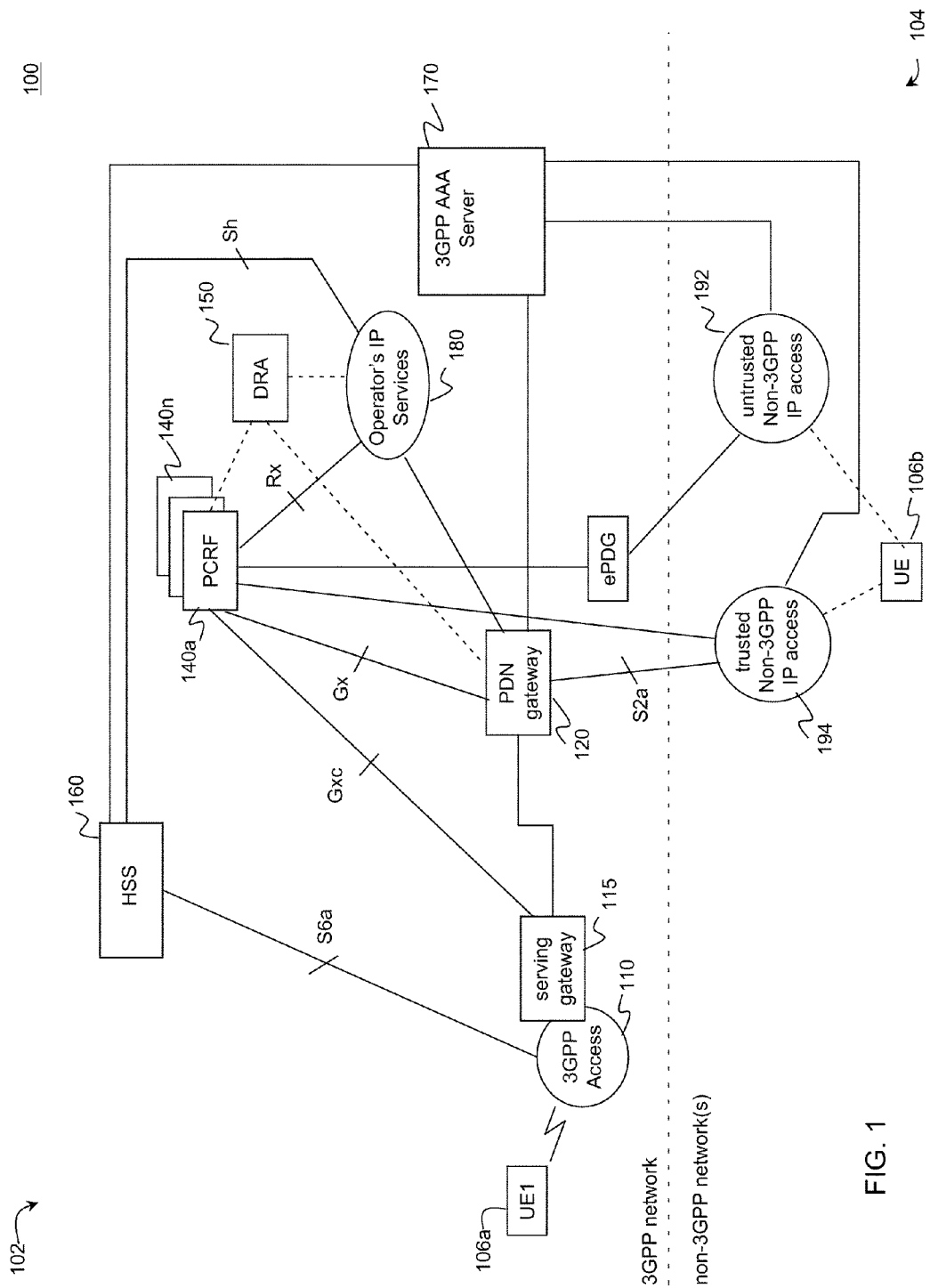
FIG. 1 depicts a conventional Third Generation Partnership Project (3GPP) long term evolution (LTE) reference architecture.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 depicts a conventional Third Generation Partnership Project (3GPP) long term evolution (LTE) reference architecture 100. Reference architecture 100 includes a 3GPP network 102 and one or more non-3GPP networks 104. 3GPP network 102 includes 3GPP access 110, one or more packet data network (PDN) gateways 120, one or more policy control and charging rules function (PCRF) 140a-n, a Diameter routing agent (DRA) 150, a home subscriber server (HSS) 160, and a 3GPP authentication, authorization, and accounting (AAA) server 170.

3GPP access 110 represents a collection of functional entities and interfaces that provide access for user equipment to 3GPP network 102. 3GPP access 110 includes a mobility management entity (MME) and an evolved universal terrestrial radio access node (E-UTRAN). User equipment (UE1) 106a accesses 3GPP network 102 via the 3GPP access "cloud" 110.

The MME manages mobility for user equipment. No user data packets go through the MME. The MME is configured to perform authentication and authorization functions, non-access stratum (NAS) signaling, security negotiations, serving gateway and/or PDN gateway selection, and UE reachability.

The MME may further be co-located with serving gateway 115. The MME/serving gateway acts as a foreign agent for a mobile IP session. Serving gateway 115 forwards and receives packets to and from the node where the user equipment is being served.

PDN-GW 120 interfaces with external packet networks (e.g., the Internet). The PDN-GW provides an anchor for 3GPP and non-3GPP mobile IP sessions. That is, the PDN-GW acts as the home agent for the mobile IP session.

In the LTE architecture, two tunneling protocols are defined for enabling mobility, Proxy Mobile IP (PMIP) and GPRS Tunneling Protocol (GTP). Both protocols require a PDN-GW acting as an IP anchor point for mobility. The protocols from Serving Gateway to PDN-GW are referred to as "PMIP-based S8" and "GTP-based S8." GTP is not supported in a non-3GPP access network. In embodiments, a PDN-GW 120 supports both GTP and PMIP on the same node.

The PDN-GW 120 may also include a policy and charging enforcement function (PCEF). The PCEF provides service data flow detection, user plane traffic handling, triggering control plane session management, Quality of Service (QoS) handling, service data flow measurement, as well as online and offline charging interactions. The PCEF enforces the policy control as indicated by the policy control and charging rules function (PCRF) 140.

PCRF 140 provides policy control decision and flow based charging control functionalities. For example, the PCRF provides network control regarding service data flow detection, gating, Quality of Service (QoS), and flow based charging to the policy control enforcement function. A PCRF may also apply security procedures before accepting service information from an Application Function (AF). Additionally, the PCRF determines how a certain data flow is treated in the policy control enforcement function and ensures that the enforcement function traffic mapping and treatment is in accordance with the user's subscription profile. For example, PCRF 140 delivers rules around traffic classification, QoS, and charging to the enforcement functions (e.g., in the PDN gateway via the Gx interface or in the serving gateway 115 via the Gxc interface). The PCRFs in a 3GPP network belong to one or more Diameter realms.

3GPP network 102 also includes the operator's IP services 180. Operator's IP services 180 includes one or more application functions (AFs) offered by an operator. AFs communicate with a PCRF via the Rx interface. An exemplary AF that may be offered by an operator is IP Multimedia Subsystem (IMS). IMS delivers IP multimedia services to mobile users. One function of IMS is the Call Session Control Function (CSCF). The CSCF may influence the QoS, bandwidth, or other attributes of an established IP-CAN session.

Diameter Routing Agent (DRA) 150 maintains information about user identity, access point name (APN), the user equipment IP address(es) and the selected PCRF for an IP-CAN session. DRA 150 initially allocates a PCRF for a session. Additionally, DRA may be queried by other network entities that need to change an existing session or establish a new Quality of Service (QoS). The DRA returns the address of the PCRF to the requesting entity.

When DRA 150 first receives a request for an IP-CAN session (e.g, from PDN gateway 120), the DRA selects a suitable PCRF for the IP-CAN session and stores the PCRF address. Subsequently, DRA 150 can retrieve the selected PCRF address according to information carried by the incoming requests from other entities (e.g., an AF). Three methods are currently being proposed for accessing a PCRF for an existing session.

A redirect DRA is an enhanced form of the Diameter redirect agent functionality. The redirect DRA is used to redirect clients (e.g., IMS function) to the appropriate PCRF. A proxy DRA is an enhanced form of the Diameter proxy agent functionality. A proxy DRA is used to forward messages from clients to the appropriate PCRF. Finally, the optimized proxy DRA is a hybrid solution where a proxy is used on IP-CAN session establishment and termination but session modification messages are sent directly to the selected PCRF.

All of these solutions require deployment of additional DRA elements in the network. Furthermore, the DRA messaging introduces additional latency on IP-CAN session establishment and termination. The redirect DRA and optimized proxy DRA solutions also have transport connection scaling issues and the proxy DRA solution introduces additional latency to IP CAN session modification exchanges due to the message forwarding.

HSS 160 stores a record for each subscriber to 3GPP network 105. The subscriber record includes a subscription profile, authentication vectors, and a list of allowed Access Point Names (APNs) for each subscriber. Each APN has a list of allowed PDN-GWs for the subscriber. An APN may be considered as the network name (e.g., Internet, corporate intranet, etc.).

User equipment 1 (UE1) 106a attaches to 3GPP network 102 over the 3GPP Radio Access Network (RAN). Upon receiving the connection attempt, UE1 106a is then authenticated/authorized by an MME. The MME also invokes gateway selection function to select a PDN gateway for the IP-CAN session with UE1 106a. Gateway selection function 140 accesses HSS 150 to retrieve a list of PDN-GWs serving the identified APN. The HSS may also return the subscriber profile and authentication vectors for UE1.

User equipment 2 (UE2) 106b attempts to access 3GPP network 102 via a non-3GPP network access mechanism. The network access may be trusted (e.g., trusted non-3GPP IP access 194) or untrusted (untrusted non-3GPP access 192). Untrusted IP access 192 accesses 3GPP network elements via an evolved Packet Data Gateway (ePDG). For example, access from a non-3GPP network may be via a Wi-Fi network or a non-GSM wireless network such as CDMA.

In the non-3GPP access scenario, an equivalent to the serving gateway originates an authentication request. The authentication request may be sent to the 3GPP AAA proxy sitting on the border of the network. The 3GPP AAA proxy accesses the HSS via the 3GPP AAA to retrieve the authentication vectors, subscriber profiles, and a list of allowed PDN-GWs.

Embodiments of the invention consider the DRA as a function rather than a new element. These embodiments locate the DRA function in the HSS and/or in the 3GPP AAA server. The DRA function in these elements shares a common state store that contains the UE-to-PCRF binding for a given IP-CAN session.

Figure 2:
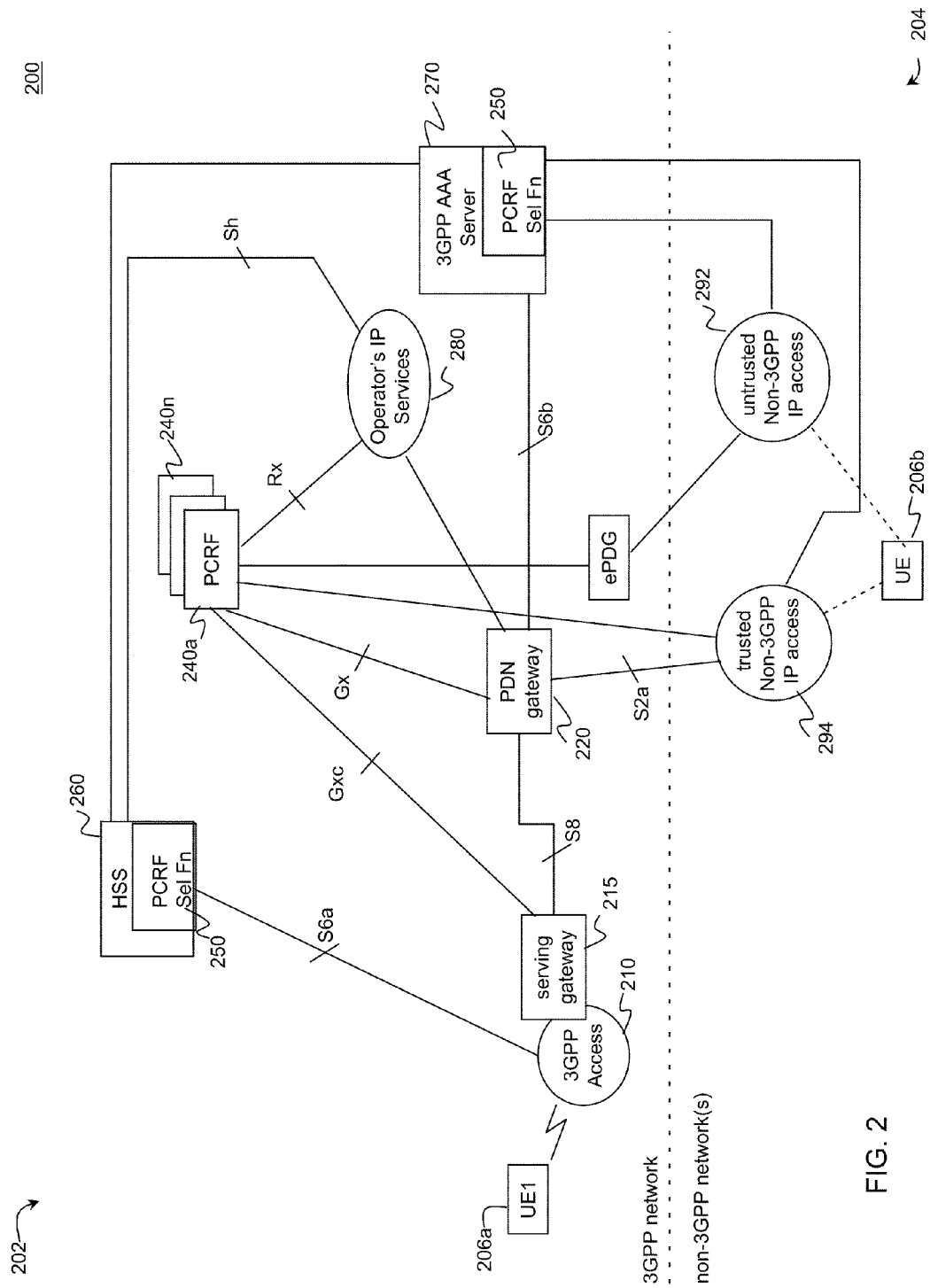
FIG. 2 depicts a block diagram of an operating environment for HSS-based and/or 3GPP AAA-based PCRF Selection Function, according to embodiments of the present invention.

FIG. 2 depicts a block diagram of an operating environment 200 for HSS-based and/or 3GPP AAA-based PCRF selection, according to embodiments of the present invention. In this embodiment, a PCRF Selection Function is located in the HSS and/or the 3GPP AAA. No additional interfaces or changes to existing interfaces are required for either 3GPP access or non-3GPP access.

Operating environment 200 includes a 3GPP network 202 and one or more non-3GPP networks 204. 3GPP network 202 includes 3GPP access 210, one or more PDN gateways 220, one or more PCRFs 240, an HSS 260, and a 3GPP AAA server 270.

In an embodiment, HSS 260 includes a PCRF Selection Function 250. In an embodiment, 3GPP AAA server 270 may also include a PCRF Selection Function 250.

Mandatory exchanges have been defined for various network entities (e.g., PDN gateway IMS CSCF). These exchanges can be enhanced to include the delivery of PCRF information, when required. For example, during a traditional attach procedure, the HSS is accessed to obtain certain data (e.g., authentication vectors) required to establish a session. As part of the existing exchange, the reply from the HSS (over the S6a interface) is modified to include the assigned PCRF.

For IMS, the CSCF is required to perform authentication and authorization (e.g., authorizing an IMS or video call). As part of the existing exchange between the CSCF and IMS, the assigned PCRF is returned over the Sh interface.

In an embodiment, the PCRF Selection Function is only required to be located in the HSS if a Bearer Binding and Event Reporting Function (BBERF) is deployed in the serving gateway. In this case, the PCRF selection takes place at the same time that the PDN Gateway is selected and returned by the HSS to the Serving Gateway over the S6a interface.

In addition to exchanges during session establishment, many additional exchanges occur after a session has been established. For example, as part of the exchanges in IMS, a message is sent to the HSS to determine whether the subscriber is valid and allowed to initiate a voice call. As part of that exchange, the PCRF Selection Function in the HSS is accessed to retrieve the PCRF. The PCRF is then returned, along with the other elements of the exchange, over the Sh interface.

The selected PCRF may also be communicated to PDN Gateway 220 over the S8 interface, if it is already known by the serving gateway. The S8 interface is the interface between a PDN gateway in the home network and a serving gateway in a visited network. The PCRF may also be communicated over the S6b interface (interface between the 3GPP AAA and the PDN gateway) if a 3GPP AAA is deployed, or over an SGi interface if an AAA function is deployed to facilitate the operator's IP services. For IMS and non-IMS application functions, the selected PCRF can be returned by the HSS to the application over the Sh interface.

Figure 3:
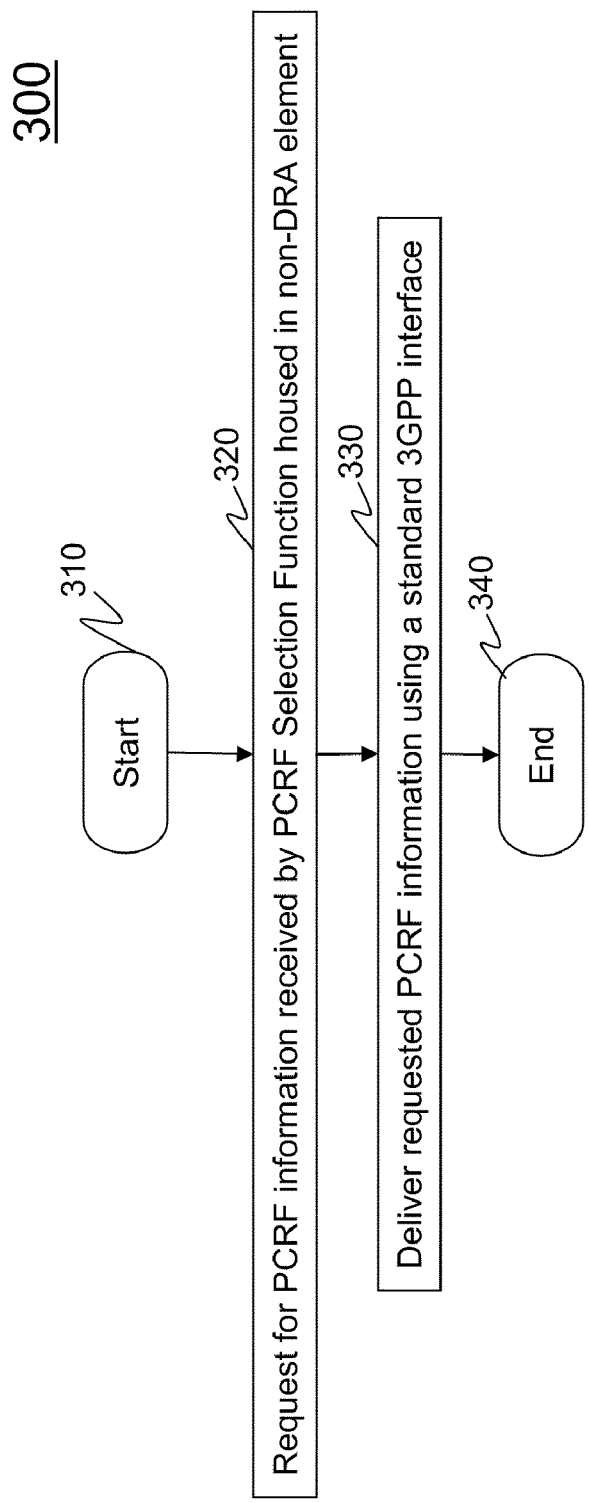
FIG. 3 depicts a flowchart of an exemplary method for HSS-based and/or 3GPP AAA-based PCRF Selection Function, according to embodiments of the present invention.
Figure 4:
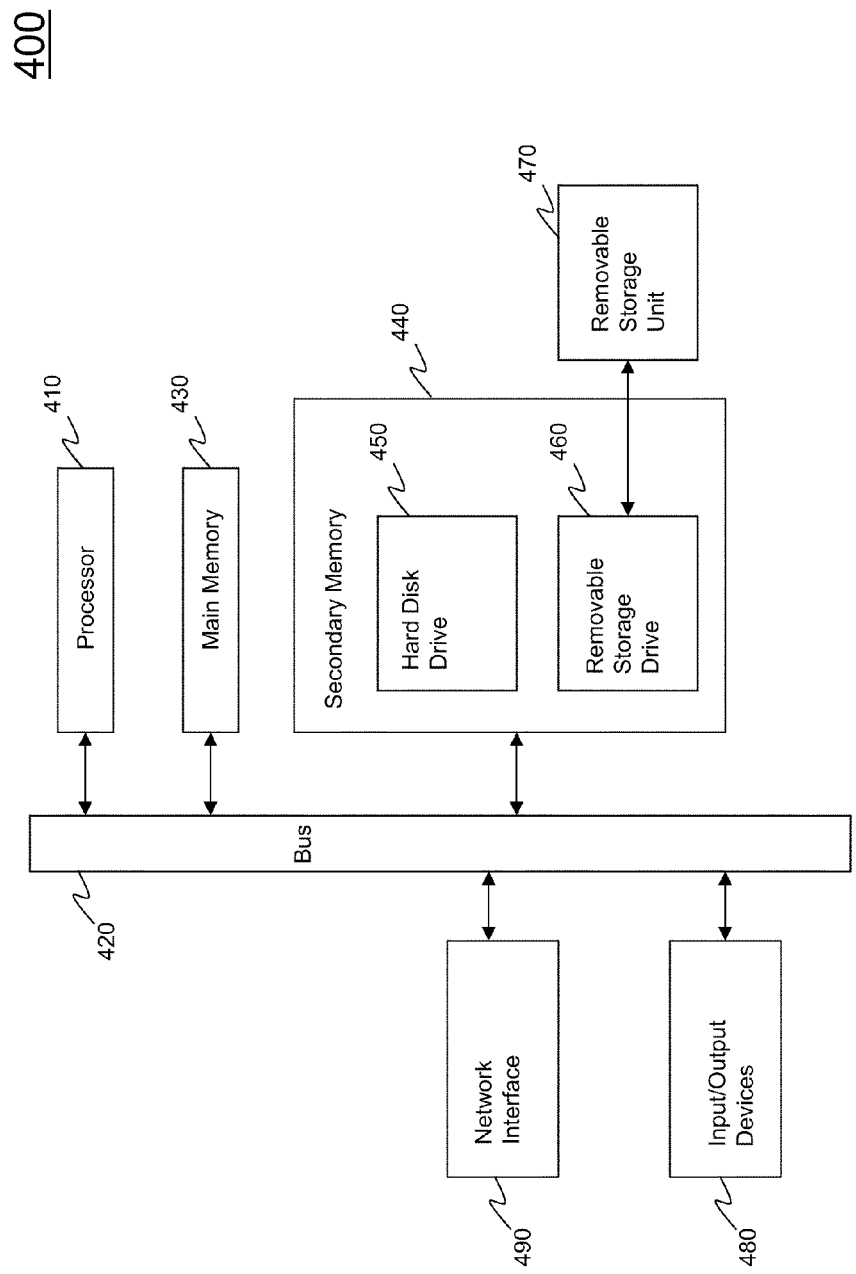
FIG. 4 is a diagram of a computer system on which the methods and systems herein described can be implemented, according to an embodiment of the invention.

FIG. 3 depicts a flowchart 300 of an exemplary method for the PCRF selection, according to embodiments of the present invention. FIG. 3 is described with continued reference to the operating environment of FIG. 2. However, method 300 is not limited to that embodiment. Method 300 begins at step 310.

In step 320, a request for PCRF information is received by a PCRF Selection Function module housed in a non-DRA element, e.g. in a HSS-based PCRF Selection Function and/or 3GPP AAA-based PCRF Selection Function.

In step 330, the DRA module delivers the requested PCRF information via a standard 3GPP interface.

Method 300 ends at step 340.

Because embodiments use existing signaling connections, the transport connection scaling issues present with the redirect DRA do not exist with the HSS-based PCRF Selection Function and/or 3GPP AAA-based PCRF Selection Function. As the selected PCRF information is included in existing message exchanges, no additional latency in IP-CAN session establishment, modification, or termination exists.

However, the embodiments share one of the characteristics of the redirect DRA solution in that the function allocating the PCRF has no knowledge of a PCRF failure or a network failure resulting in the PCRF being unreachable from the gateway or AF. The feedback on PCRF failure or unreachability can be provided over the existing transport connections to the PCRF Selection Function in the HSS or 3GPP AAA. However, it will require new message exchanges. These additional message exchanges are only used in failure cases so the additional load on the PCRF clients is negligible.

Computer System Implementation

Computer 400 includes one or more processors (also called central processing units, or CPUs), such as processor 410. Processor 410 is connected to communication bus 420. Computer 400 also includes a main or primary memory 430, preferably random access memory (RAM). Primary memory 430 has stored therein control logic (computer software), and data.

Computer 400 may also include one or more secondary storage devices 440. Secondary storage devices 440 include, for example, hard disk drive 450 and/or removable storage device or drive 460. Removable storage drive 460 represents a floppy disk drive, a magnetic tape drive, a compact disk drive, an optical storage device, tape backup, ZIP drive, JAZZ drive, etc.

Removable storage drive 460 interacts with removable storage unit 470. As will be appreciated, removable storage unit 460 includes a computer usable or readable storage medium having stored therein computer software (control logic) and/or data. Removable storage drive 460 reads from and/or writes to the removable storage unit 470 in a well known manner.

Removable storage unit 470, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 400, or multiple computer 400s to perform any combination of the functions described herein Computer programs (also called computer control logic) are stored in main memory 430 and/or the secondary storage devices 440. Such computer programs, when executed, direct computer 400 to perform the functions of the present invention as discussed herein. In particular, the computer programs, when executed, enable processor 410 to perform the functions of the present invention. Accordingly, such computer programs represent controllers of the computer 400.

Computer 400 also includes input/output/display devices 480, such as monitors, keyboards, pointing devices, etc.

Computer 400 further includes a communication or network interface 490. Network interface 490 enables computer 400 to communicate with remote devices. For example, network interface 490 allows computer 400 to communicate over communication networks, such as LANs, WANs, the Internet, etc. Network interface 490 may interface with remote sites or networks via wired or wireless connections. Computer 400 receives data and/or computer programs via network interface 490. The electrical/magnetic signals having contained therein data and/or computer programs received or transmitted by the computer 400 via interface 490 also represent computer program product(s).

The invention can work with software, hardware, and operating system implementations other than those described herein. Any software, hardware, and operating system implementations suitable for performing the functions described herein can be used.

As noted earlier, benefits of various embodiments of the current invention find applicability to the current 3GPP Release 7, to the upcoming Release 8, as well as to future releases of the 3GPP specifications.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A system, comprising:
   a policy control rules function (PCRF) Selection Function module housed in a non-Diameter Routing Agent (DRA) element within a home subscriber server (HSS), and adapted to deliver PCRF information to an operator's IP services via a Sh interface; and
   a second PCRF Selection Function module housed in a 3GPP AAA server, wherein the PCRF Selection Function module and the second PCRF Selection Function module share a common state store.

2. The system of claim 1, wherein the PCRF Selection Function module communicates PCRF information to a serving gateway via a S6a interface.

3. The system of claim 2, wherein PCRF information is communicated from the serving gateway to a PDN gateway via a S8 interface.

4. The system of claim 2, wherein a Bearer Binding and Event Reporting Function (BBERF) is deployed in the serving gateway.

5. The system of claim 1, wherein the second PCRF Selection Function module communicates PCRF information to a PDN gateway via a S6b interface.

6. A method, comprising:
   receiving a request for policy control rules function (PCRF) information by a PCRF Selection Function module housed in a non-Diameter Routing Agent (DRA) element within a home subscriber server (HSS); and
   delivering the requested PCRF information to an operator's IP services via a Sh interface;
   wherein the receiving uses a second PCRF Selection Function module housed in a 3GPP AAA server, and the second PCRF Selection Function module and the PCRF Selection Function module share a common state store.

7. The method of claim 6, further comprising delivering of the requested PCRF information to a serving gateway using a S6a interface.

8. The method of claim 7, further comprising delivering of the requested PCRF information from the serving gateway to a PDN gateway using a S8 interface.

9. The method of claim 7, wherein a Bearer Binding and Event Reporting Function (BBERF) is deployed in the serving gateway.

10. The method of claim 6, wherein delivering of the requested PCRF information by the second PCRF Selection Function module to a PDN gateway uses a S6b interface.

11. A non-transitory computer-readable medium containing instructions for controlling at least one processor by a method, comprising:

receiving a request for policy control rules function (PCRF) information by a PCRF Selection Function module housed in a non-Diameter Routing Agent (DRA) within a home subscriber server (HSS) element; and delivering the requested PCRF information to an operator's IP services via a Sh interface;

wherein the receiving uses a second PCRF Selection Function module housed in a 3GPP AAA server, and the second PCRF Selection Function module and the PCRF Selection Function module share a common state store.

12. The non-transitory computer-readable medium of claim 11, wherein the method further comprises delivering of the requested PCRF information to a serving gateway using a S6a interface.

13. The non-transitory computer-readable medium of claim 12, wherein the method further comprises delivering of the requested PCRF information from the serving gateway to a PDN gateway using a S8 interface.

14. The non-transitory computer-readable medium of claim 12, wherein a Bearer Binding and Event Reporting Function (BBERF) is deployed in the serving gateway.

15. The non-transitory computer-readable medium of claim 11, wherein the delivering of the requested PCRF information by the second PCRF Selection Function module to a PDN gateway uses a S6b interface.

16. The system of claim 1, wherein the PCRF information includes the assigned PCRF identity.

17. The method of claim 6, wherein the PCRF information includes the assigned PCRF identity.

18. The non-transitory computer-readable medium of claim 11, wherein the PCRF information includes the assigned PCRF identity.

19. A non-transitory computer-readable medium containing instructions for controlling at least one processor by a method, comprising:

receiving a request for policy control rules function (PCRF) information by a PCRF Selection Function module housed in a non-Diameter Routing Agent (DRA) element within a home subscriber server (HSS); and delivering the requested PCRF information to a serving gateway via a S6a interface;

wherein the receiving uses a second PCRF Selection Function module housed in a 3GPP AAA server, and the second PCRF Selection Function module and the PCRF Selection Function module share a common state store.

20. The non-transitory computer-readable medium of claim 19, wherein the PCRF information includes the assigned PCRF identity.

* * * * *